US011927696B2

(12) United States Patent
Zhang et al.

(10) Patent No.: US 11,927,696 B2
(45) Date of Patent: Mar. 12, 2024

(54) LIDAR SYSTEMS WITH FIBER OPTIC COUPLING

(71) Applicant: INNOVUSION IRELAND LIMITED, Los Altos, CA (US)

(72) Inventors: Rui Zhang, Palo Alto, CA (US); Yimin Li, Cupertino, CA (US); Junwei Bao, Los Altos, CA (US)

(73) Assignee: Innovusion, Inc., Sunnyvale, CA (US)

( * ) Notice: Subject to any disclaimer, the term of this patent is extended or adjusted under 35 U.S.C. 154(b) by 1200 days.

(21) Appl. No.: 16/280,604

(22) Filed: Feb. 20, 2019

(65) Prior Publication Data

US 2019/0257926 A1    Aug. 22, 2019

Related U.S. Application Data

(60) Provisional application No. 62/633,366, filed on Feb. 21, 2018.

(51) Int. Cl.
*G01S 7/481* (2006.01)
*G01S 17/89* (2020.01)
*G01S 17/931* (2020.01)

(52) U.S. Cl.
CPC .......... *G01S 7/4818* (2013.01); *G01S 7/4815* (2013.01); *G01S 7/4817* (2013.01); *G01S 17/89* (2013.01); *G01S 17/931* (2020.01)

(58) Field of Classification Search
CPC .... G01S 7/4818; G01S 7/4815; G01S 7/4817; G01S 17/89; G01S 17/931
See application file for complete search history.

(56) References Cited

U.S. PATENT DOCUMENTS

| 3,897,150 | A | 7/1975 | Bridges et al. |
|---|---|---|---|
| 4,464,048 | A | 8/1984 | Farlow |
| 4,676,586 | A | 6/1987 | Jones et al. |
| 4,923,263 | A | 5/1990 | Johnson |
| 5,006,721 | A | 4/1991 | Cameron et al. |
| 5,012,079 | A | 4/1991 | Singh et al. |
| 5,157,451 | A | 10/1992 | Taboada |
| 5,173,797 | A | 12/1992 | Zedekar et al. |
| 5,185,736 | A | 2/1993 | Tyrrell et al. |
| 5,254,893 | A | 10/1993 | Ide |
| 5,319,434 | A | 6/1994 | Croteau et al. |
| 5,369,661 | A | 11/1994 | Yamaguchi et al. |
| 5,442,358 | A | 8/1995 | Keeler et al. |

(Continued)

FOREIGN PATENT DOCUMENTS

| CA | 2629319 A1 | 7/2007 |
|---|---|---|
| CN | 1677050 A | 10/2005 |

(Continued)

OTHER PUBLICATIONS

Mirrors (Year: 2021).*

(Continued)

*Primary Examiner* — Isam A Alsomiri
*Assistant Examiner* — Sanjida Naser
(74) *Attorney, Agent, or Firm* — MASCHOFF BRENNAN; Liang Huang

(57) ABSTRACT

Embodiments discussed herein refer to LiDAR systems that use diode lasers to generate a high-repetition rate and multi-mode light pulse that is input to a fiber optic cable that transmits the light pulse to a scanning system.

30 Claims, 9 Drawing Sheets

(56) References Cited

U.S. PATENT DOCUMENTS

| | | |
|---|---|---|
| 5,504,731 A | 4/1996 | Lee et al. |
| 5,546,188 A | 8/1996 | Wangler et al. |
| 5,579,153 A | 11/1996 | Laming et al. |
| 5,657,077 A | 8/1997 | Deangelis et al. |
| 5,793,491 A | 8/1998 | Wangler et al. |
| 5,838,239 A | 11/1998 | Stern et al. |
| 5,864,391 A | 1/1999 | Hosokawa et al. |
| 5,920,140 A | 7/1999 | Nakagishi et al. |
| 5,926,259 A | 7/1999 | Bamberger et al. |
| 5,936,756 A | 8/1999 | Nakajima |
| 6,163,378 A | 12/2000 | Khoury |
| 6,317,202 B1 | 11/2001 | Hosokawa et al. |
| 6,593,582 B2 | 7/2003 | Lee et al. |
| 6,594,000 B2 | 7/2003 | Green et al. |
| 6,650,404 B1 | 11/2003 | Crawford |
| 6,950,733 B2 | 9/2005 | Stopczynski |
| 7,128,267 B2 | 10/2006 | Reichenbach et al. |
| 7,202,941 B2 | 4/2007 | Munro |
| 7,345,271 B2 | 3/2008 | Boehlau et al. |
| 7,440,084 B2 | 10/2008 | Kane |
| 7,440,175 B2 | 10/2008 | Di et al. |
| 7,489,865 B2 | 2/2009 | Varshineya et al. |
| 7,576,837 B2 | 8/2009 | Liu et al. |
| 7,830,527 B2 | 11/2010 | Chen et al. |
| 7,835,068 B1 | 11/2010 | Brooks et al. |
| 7,847,235 B2 | 12/2010 | Krupkin et al. |
| 7,880,865 B2 | 2/2011 | Tanaka et al. |
| 7,936,448 B2 | 5/2011 | Albuquerque et al. |
| 7,969,558 B2 | 6/2011 | Hall |
| 7,982,861 B2 | 7/2011 | Abshire et al. |
| 8,072,582 B2 | 12/2011 | Meneely |
| 8,471,895 B2 | 6/2013 | Banks |
| 8,736,818 B2 | 5/2014 | Weimer et al. |
| 8,749,764 B2 | 6/2014 | Hsu |
| 8,812,149 B2 | 8/2014 | Doak |
| 8,994,928 B2 | 3/2015 | Shiraishi |
| 9,048,616 B1 | 6/2015 | Robinson |
| 9,065,243 B2 | 6/2015 | Asobe et al. |
| 9,086,273 B1 | 7/2015 | Gruver et al. |
| 9,194,701 B2 | 11/2015 | Bosch |
| 9,255,790 B2 | 2/2016 | Zhu |
| 9,279,662 B2 | 3/2016 | Steffey et al. |
| 9,300,321 B2 | 3/2016 | Zalik et al. |
| 9,304,316 B2 | 4/2016 | Weiss et al. |
| 9,316,724 B2 | 4/2016 | Gehring et al. |
| 9,354,485 B2 | 5/2016 | Fermann et al. |
| 9,465,175 B2 | 10/2016 | Shi et al. |
| 9,510,505 B2 | 12/2016 | Halloran et al. |
| 9,529,083 B2 | 12/2016 | Bridges et al. |
| 9,575,184 B2 | 2/2017 | Gilliland et al. |
| 9,605,998 B2 | 3/2017 | Nozawa |
| 9,621,876 B2 | 4/2017 | Federspiel |
| 9,638,799 B2 | 5/2017 | Goodwin et al. |
| 9,696,426 B2 | 7/2017 | Zuk |
| 9,702,966 B2 | 7/2017 | Batcheller et al. |
| 9,804,264 B2 * | 10/2017 | Villeneuve ............ G01S 7/4818 |
| 9,810,776 B2 | 11/2017 | Sapir |
| 9,810,786 B1 | 11/2017 | Welford et al. |
| 9,812,838 B2 | 11/2017 | Villeneuve et al. |
| 9,823,353 B2 | 11/2017 | Eichenholz et al. |
| 9,857,468 B1 | 1/2018 | Eichenholz et al. |
| 9,869,754 B1 | 1/2018 | Campbell et al. |
| 9,879,990 B2 | 1/2018 | Klepsvik et al. |
| 9,880,263 B2 | 1/2018 | Droz et al. |
| 9,880,278 B2 | 1/2018 | Uffelen et al. |
| 9,885,778 B2 | 2/2018 | Dussan |
| 9,897,689 B2 | 2/2018 | Dussan |
| 9,910,139 B2 * | 3/2018 | Pennecot ............ G01S 7/4817 |
| 9,915,726 B2 | 3/2018 | Bailey et al. |
| 9,927,915 B2 | 3/2018 | Frame et al. |
| 9,958,545 B2 | 5/2018 | Eichenholz et al. |
| 9,989,629 B1 | 6/2018 | LaChapelle |
| 10,003,168 B1 | 6/2018 | Villeneuve |
| 10,007,001 B1 | 6/2018 | LaChapelle et al. |
| 10,012,732 B2 | 7/2018 | Eichenholz et al. |
| 10,042,159 B2 | 8/2018 | Dussan et al. |
| 10,061,019 B1 | 8/2018 | Campbell et al. |
| 10,073,166 B2 | 9/2018 | Dussan |
| 10,078,133 B2 | 9/2018 | Dussan |
| 10,094,925 B1 | 10/2018 | LaChapelle |
| 10,157,630 B2 | 12/2018 | Vaughn et al. |
| 10,191,155 B2 | 1/2019 | Curatu |
| 10,215,847 B2 | 2/2019 | Scheim et al. |
| 10,267,898 B2 | 4/2019 | Campbell et al. |
| 10,295,656 B1 | 5/2019 | Li et al. |
| 10,310,058 B1 | 6/2019 | Campbell et al. |
| 10,324,170 B1 | 6/2019 | Enberg, Jr. et al. |
| 10,324,185 B2 | 6/2019 | McWhirter et al. |
| 10,393,877 B2 | 8/2019 | Hall et al. |
| 10,429,495 B1 | 10/2019 | Wang et al. |
| 10,444,356 B2 | 10/2019 | Wu et al. |
| 10,451,716 B2 | 10/2019 | Hughes et al. |
| 10,466,342 B1 | 11/2019 | Zhu et al. |
| 10,502,831 B2 | 12/2019 | Eichenholz |
| 10,509,112 B1 | 12/2019 | Pan |
| 10,520,602 B2 | 12/2019 | Villeneuve et al. |
| 10,557,923 B2 | 2/2020 | Watnik et al. |
| 10,557,940 B2 | 2/2020 | Eichenholz et al. |
| 10,571,567 B2 | 2/2020 | Campbell et al. |
| 10,578,720 B2 | 3/2020 | Hughes et al. |
| 10,591,600 B2 | 3/2020 | Villeneuve et al. |
| 10,627,491 B2 | 4/2020 | Hall et al. |
| 10,641,872 B2 | 5/2020 | Dussan et al. |
| 10,649,136 B2 | 5/2020 | Weirich et al. |
| 10,663,564 B2 | 5/2020 | LaChapelle |
| 10,663,585 B2 | 5/2020 | McWhirter |
| 10,663,596 B2 | 5/2020 | Dussan et al. |
| 10,684,360 B2 | 6/2020 | Campbell |
| 10,732,281 B2 | 8/2020 | LaChapelle |
| 10,852,398 B2 | 12/2020 | Yu et al. |
| 10,908,262 B2 | 2/2021 | Dussan |
| 10,908,265 B2 | 2/2021 | Dussan |
| 10,908,268 B2 | 2/2021 | Zhou et al. |
| 10,969,475 B2 | 4/2021 | Li et al. |
| 10,983,218 B2 | 4/2021 | Hall et al. |
| 11,002,835 B2 | 5/2021 | Pan et al. |
| 11,009,605 B2 | 5/2021 | Li et al. |
| 11,016,192 B2 | 5/2021 | Pacala et al. |
| 11,194,048 B1 | 12/2021 | Burbank et al. |
| 2002/0136251 A1 | 9/2002 | Green et al. |
| 2002/0149757 A1* | 10/2002 | Kelsey ............... G03F 7/70566 355/71 |
| 2004/0135992 A1 | 7/2004 | Munro |
| 2005/0033497 A1 | 2/2005 | Stopczynski |
| 2005/0190424 A1 | 9/2005 | Reichenbach et al. |
| 2005/0195383 A1 | 9/2005 | Breed et al. |
| 2006/0071846 A1 | 4/2006 | Yanagisawa et al. |
| 2006/0132752 A1 | 6/2006 | Kane |
| 2007/0091948 A1 | 4/2007 | Di et al. |
| 2007/0188735 A1 | 8/2007 | Braunecker et al. |
| 2007/0216995 A1 | 9/2007 | Bollond et al. |
| 2008/0037028 A1 | 2/2008 | Cheung et al. |
| 2008/0074640 A1 | 3/2008 | Walsh et al. |
| 2008/0174762 A1 | 7/2008 | Liu et al. |
| 2008/0192228 A1 | 8/2008 | Eaton |
| 2008/0193135 A1 | 8/2008 | Du et al. |
| 2009/0010644 A1 | 1/2009 | Varshneya et al. |
| 2009/0028193 A1 | 1/2009 | Islam |
| 2009/0051926 A1 | 2/2009 | Chen |
| 2009/0059201 A1 | 3/2009 | Willner et al. |
| 2009/0067453 A1 | 3/2009 | Mizuuchi et al. |
| 2009/0142086 A1 | 6/2009 | Leclair et al. |
| 2009/0147239 A1 | 6/2009 | Zhu |
| 2009/0262760 A1 | 10/2009 | Krupkin et al. |
| 2009/0316134 A1 | 12/2009 | Michael et al. |
| 2010/0006760 A1 | 1/2010 | Lee et al. |
| 2010/0020306 A1 | 1/2010 | Hall |
| 2010/0020377 A1 | 1/2010 | Brochers et al. |
| 2010/0027602 A1 | 2/2010 | Abshire et al. |
| 2010/0045965 A1 | 2/2010 | Meneely |
| 2010/0053715 A1 | 3/2010 | O'Neill et al. |
| 2010/0128109 A1 | 5/2010 | Banks |
| 2010/0271614 A1 | 10/2010 | Albuquerque et al. |
| 2011/0181864 A1 | 7/2011 | Schmitt et al. |

(56) References Cited

U.S. PATENT DOCUMENTS

| | | | |
|---|---|---|---|
| 2011/0185935 A1 | 8/2011 | Jennings et al. | |
| 2011/0216792 A1* | 9/2011 | Chann | G02B 19/009 372/31 |
| 2011/0306956 A1 | 12/2011 | Islam | |
| 2012/0038903 A1 | 2/2012 | Weimer et al. | |
| 2012/0124113 A1 | 5/2012 | Zalik et al. | |
| 2012/0162749 A1* | 6/2012 | Gusev | H01S 5/042 359/341.3 |
| 2012/0221142 A1 | 8/2012 | Doak | |
| 2013/0107016 A1 | 5/2013 | Federspeil | |
| 2013/0116971 A1 | 5/2013 | Retkowski et al. | |
| 2013/0241761 A1 | 9/2013 | Cooper et al. | |
| 2013/0293867 A1 | 11/2013 | Hsu et al. | |
| 2013/0293946 A1 | 11/2013 | Fermann et al. | |
| 2013/0314694 A1 | 11/2013 | Tchoryk, Jr. et al. | |
| 2013/0329279 A1 | 12/2013 | Nati et al. | |
| 2013/0342822 A1 | 12/2013 | Shiraishi | |
| 2014/0036252 A1 | 2/2014 | Amzajerdian et al. | |
| 2014/0078514 A1 | 3/2014 | Zhu | |
| 2014/0104594 A1 | 4/2014 | Gammenthaler | |
| 2014/0226140 A1 | 8/2014 | Chuang et al. | |
| 2014/0347650 A1 | 11/2014 | Bosch | |
| 2014/0350836 A1 | 11/2014 | Stettner et al. | |
| 2015/0078123 A1 | 3/2015 | Batcheller et al. | |
| 2015/0084805 A1 | 3/2015 | Dawber | |
| 2015/0109603 A1 | 4/2015 | Kim et al. | |
| 2015/0116692 A1 | 4/2015 | Zuk et al. | |
| 2015/0139259 A1 | 5/2015 | Robinson | |
| 2015/0158489 A1 | 6/2015 | Oh et al. | |
| 2015/0338270 A1 | 11/2015 | Williams et al. | |
| 2015/0355327 A1 | 12/2015 | Goodwin et al. | |
| 2016/0003946 A1 | 1/2016 | Gilliland et al. | |
| 2016/0047896 A1 | 2/2016 | Dussan | |
| 2016/0047900 A1 | 2/2016 | Dussan | |
| 2016/0061655 A1 | 3/2016 | Nozawa | |
| 2016/0061935 A1 | 3/2016 | Mccloskey et al. | |
| 2016/0100521 A1 | 4/2016 | Halloran et al. | |
| 2016/0117048 A1 | 4/2016 | Frame et al. | |
| 2016/0139266 A1 | 5/2016 | Montoya et al. | |
| 2016/0172819 A1 | 6/2016 | Ogaki | |
| 2016/0178736 A1 | 6/2016 | Chung | |
| 2016/0226210 A1 | 8/2016 | Zayhowski et al. | |
| 2016/0245902 A1 | 8/2016 | Natnik | |
| 2016/0259038 A1 | 8/2016 | Retterath et al. | |
| 2016/0273034 A1 | 9/2016 | Lundquist et al. | |
| 2016/0291134 A1 | 10/2016 | Droz et al. | |
| 2016/0313445 A1 | 10/2016 | Bailey et al. | |
| 2016/0327646 A1 | 11/2016 | Scheim et al. | |
| 2016/0377721 A1 | 12/2016 | Lardin et al. | |
| 2017/0003116 A1 | 1/2017 | Yee et al. | |
| 2017/0153319 A1 | 6/2017 | Villeneuve et al. | |
| 2017/0242104 A1 | 8/2017 | Dussan | |
| 2017/0299721 A1 | 10/2017 | Eichenholz et al. | |
| 2017/0307738 A1 | 10/2017 | Schwarz et al. | |
| 2017/0365105 A1 | 12/2017 | Rao et al. | |
| 2018/0031678 A1 | 2/2018 | Singer et al. | |
| 2018/0040171 A1 | 2/2018 | Kundu et al. | |
| 2018/0050704 A1 | 2/2018 | Tascione et al. | |
| 2018/0069367 A1 | 3/2018 | Villeneuve et al. | |
| 2018/0152691 A1 | 5/2018 | Pacala et al. | |
| 2018/0158471 A1 | 6/2018 | Vaughn et al. | |
| 2018/0164439 A1 | 6/2018 | Droz et al. | |
| 2018/0156896 A1 | 7/2018 | O'Keeffe | |
| 2018/0188355 A1 | 7/2018 | Bao et al. | |
| 2018/0188357 A1 | 7/2018 | Li et al. | |
| 2018/0188358 A1 | 7/2018 | Li et al. | |
| 2018/0188371 A1 | 7/2018 | Bao et al. | |
| 2018/0210084 A1 | 7/2018 | Zwölfer et al. | |
| 2018/0275274 A1 | 9/2018 | Bao et al. | |
| 2018/0284241 A1 | 10/2018 | Campbell et al. | |
| 2018/0284242 A1 | 10/2018 | Campbell | |
| 2018/0284286 A1 | 10/2018 | Eichenholz et al. | |
| 2018/0329060 A1 | 11/2018 | Pacala et al. | |
| 2018/0359460 A1 | 12/2018 | Pacala et al. | |
| 2019/0025428 A1 | 1/2019 | Li et al. | |
| 2019/0107607 A1 | 4/2019 | Danziger | |
| 2019/0107623 A1 | 4/2019 | Campbell et al. | |
| 2019/0120942 A1 | 4/2019 | Zhang et al. | |
| 2019/0120962 A1 | 4/2019 | Gimpel et al. | |
| 2019/0154804 A1 | 5/2019 | Eichenholz | |
| 2019/0154807 A1 | 5/2019 | Steinkogler et al. | |
| 2019/0212416 A1 | 7/2019 | Li et al. | |
| 2019/0250254 A1 | 8/2019 | Campbell et al. | |
| 2019/0257924 A1 | 8/2019 | Li et al. | |
| 2019/0265334 A1 | 8/2019 | Zhang et al. | |
| 2019/0265336 A1 | 8/2019 | Zhang et al. | |
| 2019/0265337 A1 | 8/2019 | Zhang et al. | |
| 2019/0265339 A1 | 8/2019 | Zhang et al. | |
| 2019/0273365 A1* | 9/2019 | Zediker | H01S 3/09415 |
| 2019/0277952 A1 | 9/2019 | Beuschel et al. | |
| 2019/0310368 A1 | 10/2019 | LaChapelle | |
| 2019/0369215 A1 | 12/2019 | Wang et al. | |
| 2019/0369258 A1 | 12/2019 | Hall et al. | |
| 2019/0383915 A1 | 12/2019 | Li et al. | |
| 2020/0142070 A1 | 5/2020 | Hall et al. | |
| 2020/0227882 A1 | 7/2020 | Zhang et al. | |
| 2020/0256964 A1 | 8/2020 | Campbell et al. | |
| 2020/0284906 A1 | 9/2020 | Eichenholz et al. | |
| 2020/0319310 A1 | 10/2020 | Hall et al. | |
| 2020/0341124 A1 | 10/2020 | Yu et al. | |
| 2020/0400798 A1 | 12/2020 | Rezk et al. | |
| 2021/0088630 A9 | 3/2021 | Zhang | |
| 2021/0165169 A1 | 6/2021 | Takano et al. | |
| 2022/0050187 A1 | 2/2022 | Yao | |

FOREIGN PATENT DOCUMENTS

| | | | |
|---|---|---|---|
| CN | 101201403 A | 6/2008 | |
| CN | 103750814 A | 4/2014 | |
| CN | 103792544 A | 5/2014 | |
| CN | 204216401 U | * 3/2015 | |
| CN | 204758260 U | 11/2015 | |
| CN | 204885804 U | 12/2015 | |
| CN | 204885804 U | * 12/2015 | |
| CN | 205643711 U | 10/2016 | |
| CN | 108132472 A | 6/2018 | |
| CN | 207457508 U | 6/2018 | |
| CN | 207557465 U | 6/2018 | |
| CN | 208314210 U | 1/2019 | |
| CN | 208421228 U | 1/2019 | |
| CN | 109690383 A | 4/2019 | |
| CN | 208705506 U | 4/2019 | |
| CN | 106597471 B | 5/2019 | |
| CN | 209280923 U | 8/2019 | |
| CN | 108445468 B | 11/2019 | |
| CN | 110031823 B | 3/2020 | |
| CN | 108089201 B | 4/2020 | |
| CN | 109116331 B | 4/2020 | |
| CN | 109917408 8 | 4/2020 | |
| CN | 109116366 B | 5/2020 | |
| CN | 109116367 B | 5/2020 | |
| CN | 110031822 B | 5/2020 | |
| CN | 211655309 U | 10/2020 | |
| CN | 109188397 B | 11/2020 | |
| CN | 109814086 B | 11/2020 | |
| CN | 109917348 B | 11/2020 | |
| CN | 110492856 B | 11/2020 | |
| CN | 110736975 B | 11/2020 | |
| CN | 109725320 B | 12/2020 | |
| CN | 110780284 B | 12/2020 | |
| CN | 110780283 B | 1/2021 | |
| CN | 110784220 B | 2/2021 | |
| CN | 212623082 U | 2/2021 | |
| CN | 110492349 B | 3/2021 | |
| CN | 109950784 B | 5/2021 | |
| CN | 213182011 U | 5/2021 | |
| CN | 213750313 U | 7/2021 | |
| CN | 214151038 U | 9/2021 | |
| CN | 109814082 B | 10/2021 | |
| CN | 113491043 A | 10/2021 | |
| CN | 214795200 U | 11/2021 | |
| CN | 214795206 U | 11/2021 | |
| CN | 214895784 U | 11/2021 | |
| CN | 214895810 U | 11/2021 | |

(56) References Cited

FOREIGN PATENT DOCUMENTS

| | | | |
|---|---|---|---|
| CN | 215641806 U | 1/2022 | |
| CN | 112639527 8 | 2/2022 | |
| CN | 215932142 U | 3/2022 | |
| CN | 112578396 B | 4/2022 | |
| DE | 102012202637 A1 * | 8/2013 | ........... G02B 26/124 |
| EP | 0 757 257 A2 | 2/1997 | |
| EP | 1 237 305 A2 | 9/2002 | |
| EP | 1 923 721 A1 | 5/2008 | |
| EP | 2 157 445 A2 | 2/2010 | |
| EP | 2 395 368 A1 | 12/2011 | |
| EP | 2 889 642 A1 | 7/2015 | |
| GB | 1 427 164 A | 3/1976 | |
| GB | 1427164 A | 3/1976 | |
| GB | 2000411 | 1/1979 | |
| JP | H9-297014 A | 11/1997 | |
| JP | 2002221574 A | 8/2002 | |
| JP | 2005009956 A | 1/2005 | |
| JP | 2007144667 A | 6/2007 | |
| JP | 2010035385 A | 2/2010 | |
| JP | 2010085316 A | 4/2010 | |
| JP | 2012-26921 | 2/2012 | |
| JP | 2012-83289 A | 4/2012 | |
| JP | 2015-111160 A | 6/2015 | |
| JP | 2016014665 A | 1/2016 | |
| JP | 2017-003347 A | 1/2017 | |
| JP | 2017-138301 A | 8/2017 | |
| KR | 20100096931 A | 9/2010 | |
| KR | 10-2012-0013515 A | 2/2012 | |
| KR | 10-2013-0068224 A | 6/2013 | |
| KR | 10-2018-0107673 A | 10/2018 | |
| WO | 02101408 A1 | 12/2002 | |
| WO | 2004065984 A1 | 8/2004 | |
| WO | 2006088822 A2 | 8/2006 | |
| WO | 2010000751 A1 | 1/2010 | |
| WO | 2014203854 A1 | 12/2014 | |
| WO | 2015/120118 A1 | 8/2015 | |
| WO | 2018162010 A1 | 10/2016 | |
| WO | 2017/110417 A1 | 6/2017 | |
| WO | 2018/125725 A1 | 7/2018 | |
| WO | 2018/129410 A1 | 7/2018 | |
| WO | 2018126248 A1 | 7/2018 | |
| WO | 2018129408 A1 | 7/2018 | |
| WO | 2018129409 A1 | 7/2018 | |
| WO | 2018129410 A1 | 7/2018 | |
| WO | 2018175990 | 9/2018 | |
| WO | 2018182812 A2 | 10/2018 | |
| WO | 2019079642 | 4/2019 | |
| WO | 2019165095 | 8/2019 | |
| WO | 2019165289 A1 | 8/2019 | |
| WO | 2019165294 | 8/2019 | |
| WO | 2020013890 A2 | 1/2020 | |

OTHER PUBLICATIONS

Why Wavelengths Matter in Fiber Optics—FirstLight (Year: 2021).*
CN-204885804-U (Year: 2015).*
Chen, X, et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.
Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., 6 pages.
International Preliminary Report on Patentability, dated Jul. 9, 2019, for International Application No. PCT/US2018/012703, 10 pages.
International Preliminary Report on Patentability, dated Jul. 9, 2019, for International Application No. PCT/US2018/012704, 7 pages.
International Preliminary Report on Patentability, dated Jul. 9, 2019, for International Application No. PCT/US2018/012705, 7 pages.
International Search Report and Written Opinion, dated Jan. 17, 2020, for International Application No. PCT/US2019/019276, 14 pages.
International Search Report and Written Opinion, dated Jul. 9, 2019, for International Application No. PCT/US2019/018987, 17 pages.
International Search Report and Written Opinion, dated Sep. 18, 2018, for International Application No. PCT/US2018/012116, 12 pages.
International Search Report and Written Opinion, dated May 3, 2019, for International Application No. PCT/US2019/019272, 16 pages.
International Search Report and Written Opinion, dated May 6, 2019, for International Application No. PCT/US2019/019264, 15 pages.
International Search Report and Written Opinion, dated Jan. 3, 2019, for International Application No. PCT/US2018/056577, 15 pages.
International Search Report and Written Opinion, dated Mar. 23, 2018, for International Application No. PCT/US2018/012704, 12 pages.
International Search Report and Written Opinion, dated Jun. 7, 2018, for International Application No. PCT/US2018/024185, 9 pages.
International Preliminary Report on Patentability, dated Apr. 30, 2020, for International Application No. PCT/US2018/056577, 8 pages.
European Search Report, dated Jul. 17, 2020, for EP Application No. 18776977.3, 12 pages.
Extended European Search Report, dated Jul. 10, 2020, for EP Application No. 18736738.8, 9 pages.
Gunzung, Kim, et al. (Mar. 2, 2016). "A hybrid 3D LIDAR imager based on pixel-by-pixel scanning and DS-OCDMA," pages Proceedings of SPIE [Proceedings of SPIE ISSN 0277-786X vol. 10524], SPIE, US, vol. 9751, pp. 975119-975119-8.
Extended European Search Report, dated Jul. 22, 2020, for EP Application No. 18736685.1, 10 pages.
Gluckman, J. (May 13, 2016). "Design of the processing chain for a high-altitude, airborne, single-photon lidar mapping instrument," Proceedings of SPIE; [Proceedings of SPIE ISSN 0277-786X vol. 10524], SPIE, US, vol. 9832, 9 pages.
Office Action Issued in Japanese Patent Application No. 2019-536019 dated Nov. 30, 2021, 6 pages.
European Search Report, dated Jun. 17, 2021, for EP Application No. 18868896.4, 7 pages.
"Fiber laser," Wikipedia, https://en.wikipedia.org/wiki/Fiber_laser, 6 pages.
International Search Report and Written Opinion, dated Mar. 19, 2018, for International Application No. PCT/US2018/012705, 12 pages.
International Search Report and Written Opinion, dated Mar. 20, 2018, for International Application No. PCT/US2018/012703, 13 pages.
"Mirrors", Physics LibreTexts, https://phys.libretexts.org/Bookshelves/Optics/Supplemental_Modules_(Components)/ Mirrors, (2021), 2 pages.
"Why Wavelengths Matter in Fiber Optics", FirstLight, https://www.firstlight.net/why-wavelengths-matter-in-fiber-optics/, (2021), 5 pages.
Johnson, Lee., "Parabolic Mirror: How It Works & Types (w/ Examples)", https://sciencing.com/parabolic-mirror-how-it-works-types-w-examples-diagram-13722364.html, Dec. 28, 2020, 14 pages.
Helser, George., "Laser damage threshold—Galvo Mirror vs Polygon mirror", https://precisionlaserscanning.com/2016/03/laser-damage-threshold-galvo-mirror-vs-polygon-mirror/, Mar. 25, 2016, 4 pages.
Office Action issued in Japanese Patent Application No. 2019-536925 dated Nov. 9, 2021, 8 pages.
International Search Report and Written Opinion issued in International Application No. PCT/US21/60660 dated Feb. 8, 2022, 9 pages.
Hariyama et al., "High accuracy distance measurement under high temperature environment using two-color method," Japan Society of Applied Physics, p. 606.
International Search Report and Written Opinion issued in International Application No. POT/US2019/018786 dated Jun. 14, 2019, 13 pages.

(56) References Cited

OTHER PUBLICATIONS

Office Action issued in Chinese Application No. 201880014734.1 dated Oct. 8, 2022, 40 pages.
"Optical fiber connector," Wikipedia, https://en.wikipedia.org/wiki/Optical_fiber_connector, downloaded on Nov. 21, 2022, 9 pages.
Lei, Ming, et al. "Laser Assisted Obstacle Detection Method for Intelligent Vehicles," Journal of Xi'an Technological University, vol. 35 No. 1, Jan. 2015, pp. 39-44.
Chen, Li et al. "LiDAR technology and its application," Journal of Henan Polytechnic University (Natural Sciences), vol. 28, No. 5, Oct. 2009, pp. 583-586.

* cited by examiner

LIDAR SYSTEMS WITH FIBER OPTIC COUPLING

CROSS-REFERENCE TO A RELATED APPLICATION

This application claims the benefit of U.S. Provisional Application No. 62/633,366, filed Feb. 21, 2018, the disclosure of which is incorporated herein in its entirety.

FIELD OF THE INVENTION

The present disclosure relates to light detection and ranging (LiDAR), and in particular to LiDAR systems and methods for use in a vehicle.

BACKGROUND

Systems exist that enable vehicles to be driven semi-autonomously or fully autonomously. Such systems may use one or more range finding, mapping, or object detection systems to provide sensory input to assist in semi-autonomous or fully autonomous vehicle control. Conventional LiDAR systems can use fiber optic lasers or diode lasers as the light source. Both light sources have their advantages and disadvantages.

BRIEF SUMMARY

Embodiments discussed herein refer to LiDAR systems that use diode lasers to generate a high-repetition rate and multi-mode light pulse that is input to a fiber optic cable that transmits the light pulse to a scanning system. The fiber optic cable enables the diode lasers to be separated from the scanning system. This separation provides advantages of enhanced temperature control of the diode laser, especially if they are contained in a relatively more temperature controlled environment than that of the scanning system, and further provides design flexibility for the scanning system, which no longer has to house the diode lasers.

A laser system for use with a fiber optic cable is provided according to one embodiment. The laser system can include control circuitry and a multi-diode laser and optical fiber coupling (MDOFC) coupled the control circuitry and the fiber optic cable, the MDOFC operative to generate an optic fiber input beam that is a stack of integrated beams derived from a plurality of diode lasers that emit beams in a multi-mode, wherein the optic fiber input beam is input into the fiber optic cable.

A light detection and ranging (LiDAR) system is provided according an embodiment that includes a control system constructed to be contained within an interior portion of a vehicle. The control system can include control circuitry, and a multi-diode laser and optical fiber coupling (MDOFC) coupled the control circuitry and operative to generate an integrated light beam derived from a plurality of light beams. The system can include a scanning system constructed to be mounted to an exterior portion of the vehicle, and a fiber optic cable coupled to the MDOFC and the scanning system, wherein the fiber optic cable transmits the integrated light beam to the scanning system.

A light detection and ranging (LiDAR) system is provided according to another embodiment. The system can include a control system contained within a temperature controlled environment. The control system can include control circuitry, at least one diode laser each operative to emit a light beam in response to control signals provided by the control circuitry, and a lens that converges each light beam to have an angle less than a threshold. The system can include a scanning system mounted outside of the temperature controlled environment, and a fiber optic cable coupled to the control system and the scanning system, wherein the fiber optic cable receives a converged light beam from the lens and transmits the light beam to the scanning system.

A further understanding of the nature and advantages of the embodiments discussed herein may be realized by reference to the remaining portions of the specification and the drawings.

DETAILED DESCRIPTION

Illustrative embodiments are now described more fully hereinafter with reference to the accompanying drawings, in which representative examples are shown. Indeed, the disclosed communication systems and methods may be embodied in many different forms and should not be construed as limited to the embodiments set forth herein. Like numbers refer to like elements throughout.

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

Figure 1:
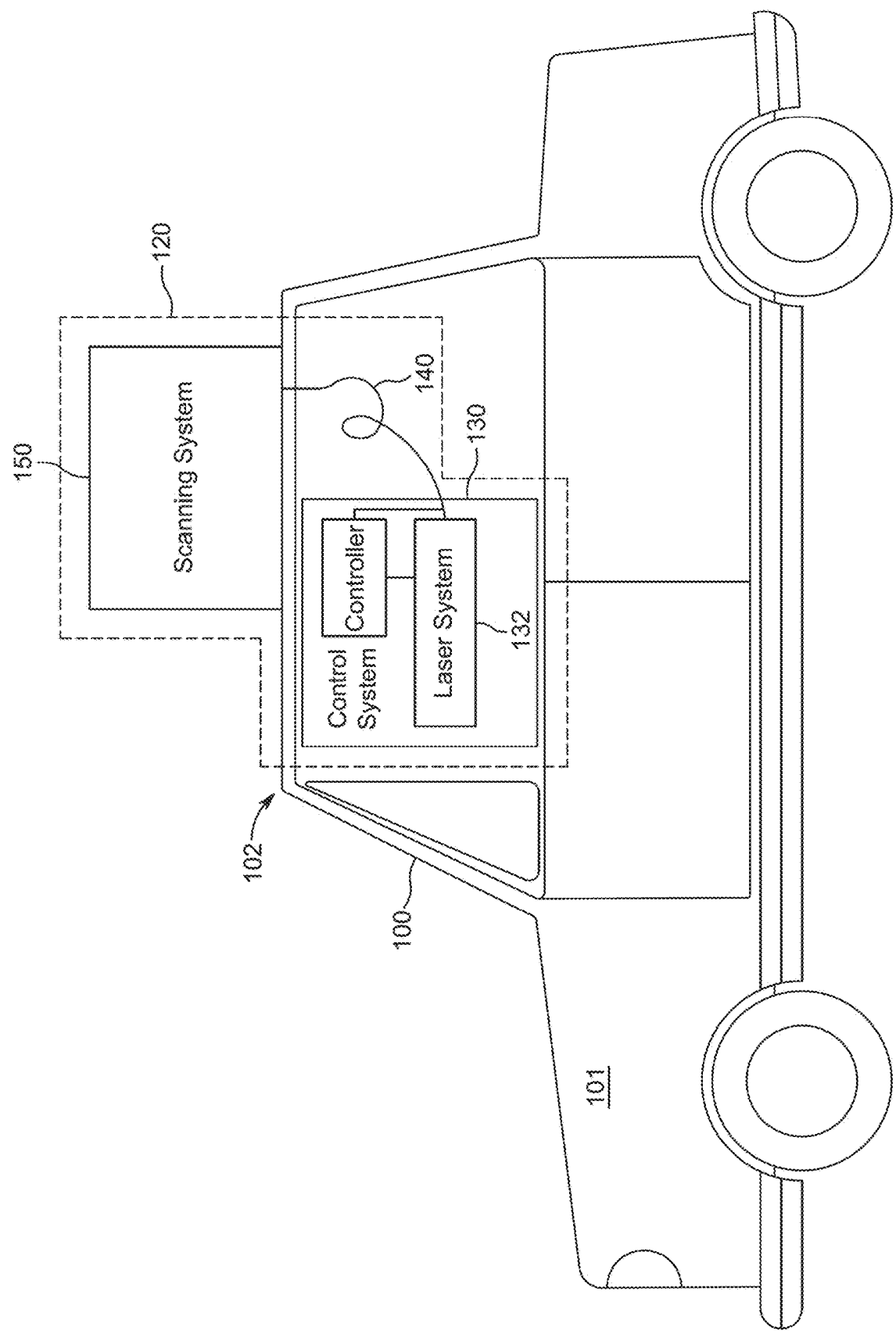
FIG. 1 shows an illustrative vehicle having a LiDAR system that is attached to and/or incorporated therein, according to an embodiment.

FIG. 1 shows an illustrative vehicle 100 having a LiDAR system 120 that is attached to and/or incorporated therein according to an embodiment. Vehicle 100 can be generically classified as having interior portion 101 and exterior portion 102. Interior portion 101 may be portions of vehicle 100 that are not directly exposed to external environmental factors such as the environment conditions (e.g., water, humidity, sun, ice, wind, etc.) and road conditions (e.g., road debris). Interior portion 101 may be influenced by external environment conditions but to a lesser degree than exterior portion 102. LiDAR system 120 may include, among other features, control system 130, cable system 140, and scanning system 150. Control system 130 may be contained within interior portion 101, scanning system 150 may be mounted to exterior portion 102, and cable system 140 may exist solely within interior portion 101 or can exist as part of interior portion 101 and exterior portion 102.

Control system 130 can include controller 132 and laser system 134. Controller 132 and laser system 134 may be coupled to scanning system 150 via cable system 140. Laser system 134 may transmit light pulses through cable system 140 to scanning system 150. Laser system 134 may use diode lasers to generate light pulses or fiber lasers. Controller 132 may control a current source at which laser system 134 transmits its light pulses. Controller 132 may receive detector signals from scanning system 150 via cable system 140. The detector signals may be the return or consequence signals that are detected by one or more detectors when the transmitted light pulses bounce of an object being observed by scanning system 150. Scanning system 150 may include the appropriate lenses, mirrors, steering optics, and detectors needed to capture an image of a scene existing within a vicinity of vehicle 100.

LiDAR system 120 separates laser system 132 and scanning system 150 from each other such that laser system 132 is contained within interior portion 101. Keeping laser system 132 (and other components associated with control system 130) within interior portion 101 provides an environment that is less harsh than that of exterior portion 102. This provides cooling advantages over containing laser system 134 as part of scanning system 150, which is located on exterior portion 102. Laser system 134 can use diode lasers or fiber lasers, and the light pulses transmit through cable system 140 to scanning system 150. Cable system 140 can include one or more fiber optic cables for transmitting light pulses from laser system 134 to scanning system 150. Cable system 140 can include one or more electrical conduits for transferring electrical signals between control system 130 and scanning system 150. For example, control system 130 may provide instructions to scanning system 150 to control steering optics. As another example, scanning system 150 may provide detection signals to controller 132 via cable system 140.

Figure 2A:
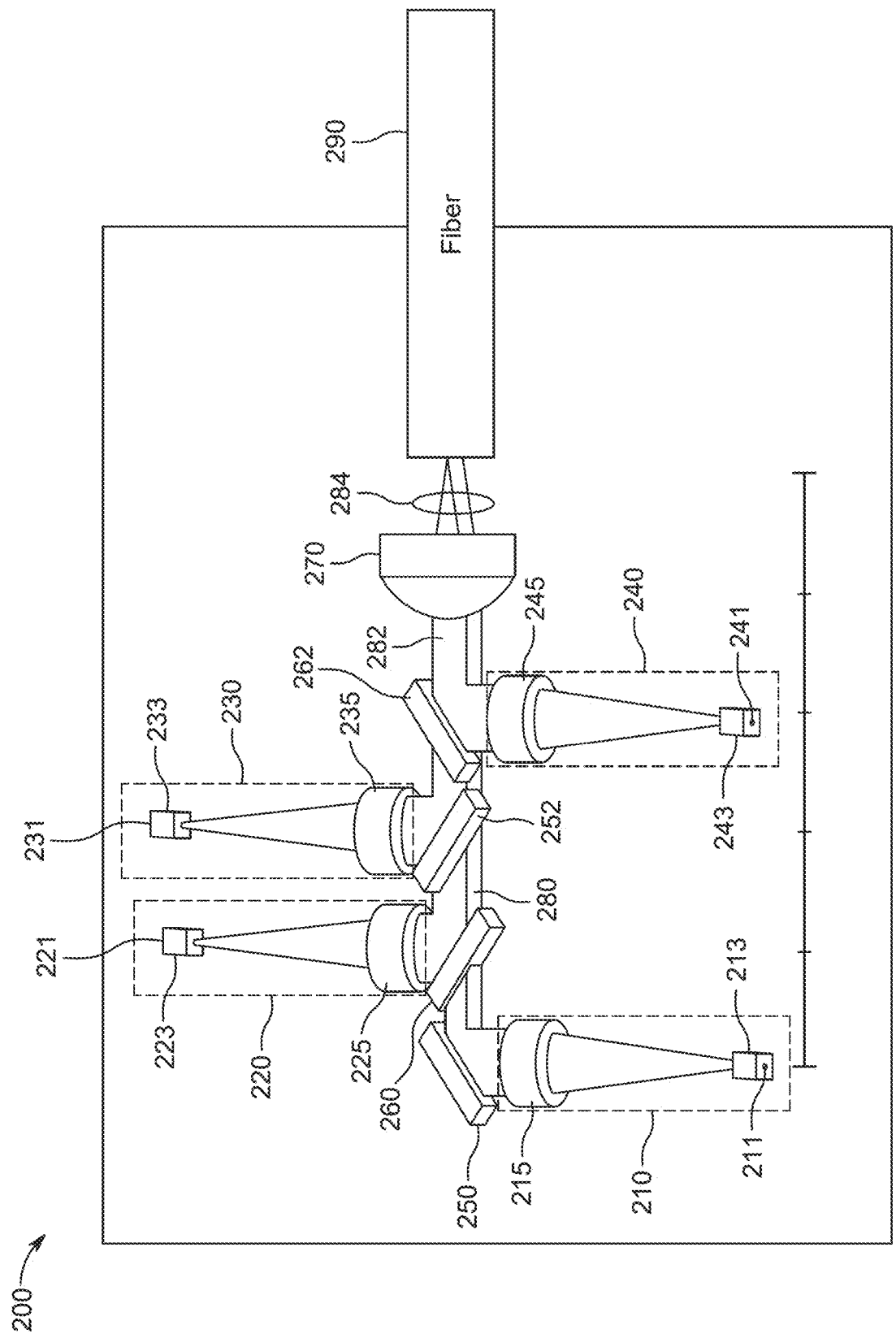
FIGS. 2A and 2B show different illustrative views of multi-diode laser and optical fiber coupling, according to an embodiment.
Figure 2B:
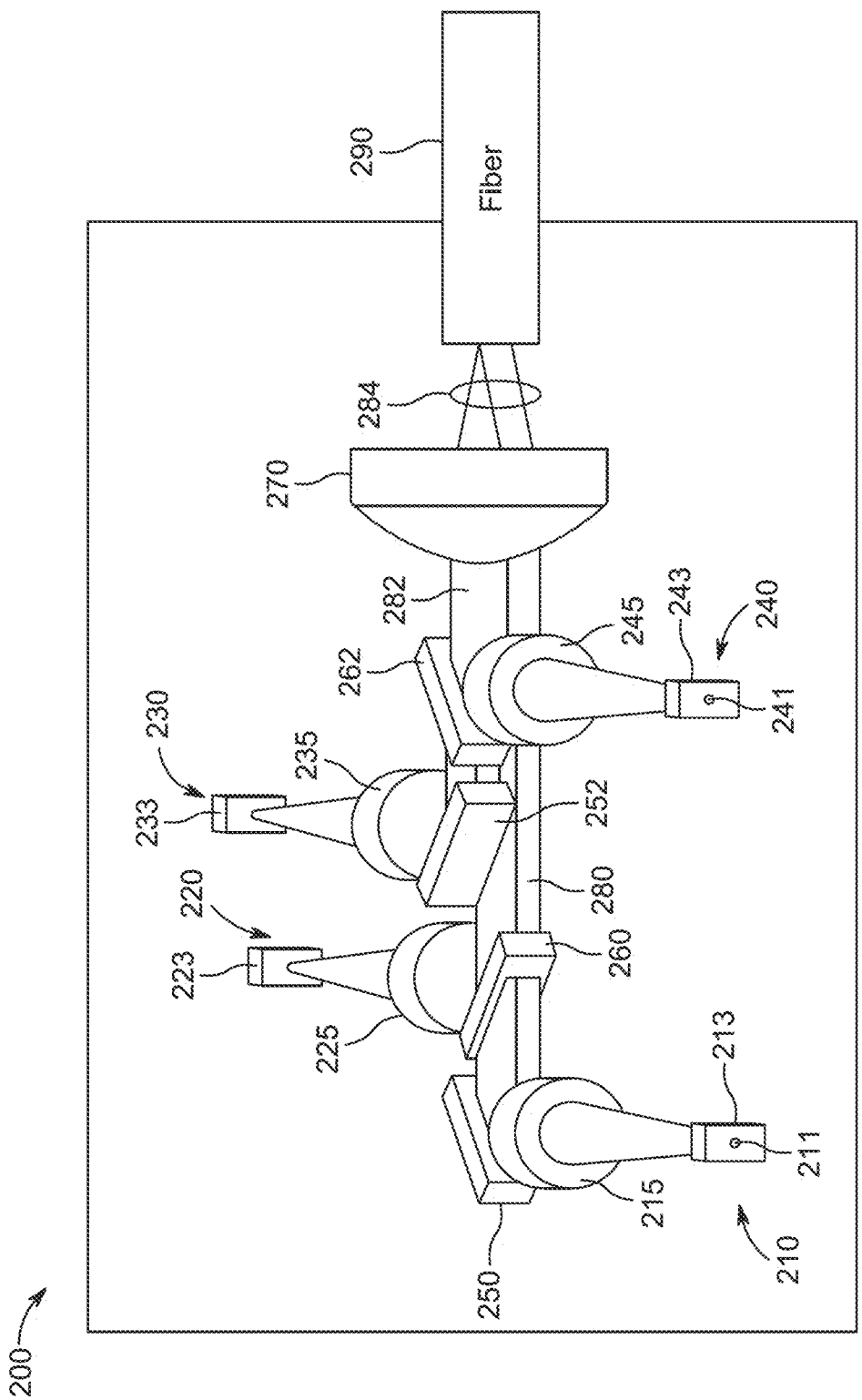

FIGS. 2A and 2B show different illustrative views of multi-diode laser and optical fiber coupling (MDOFC) 200 according to an embodiment. MDOFC 200 shows several diode lasers that each emit beams that are coupled into fiber optic cable 290. Fiber optic cable 290 may be connected to a scanning system (not shown) and serves as a transmission conduit of light pulses (originating from the diodes) that are used by the scanning system. MDOFC 200 can include diode sub-systems 210, 220, 230, and 240, mirrors 250 and 252, polarization beam splitters (PBS) 260 and 262, lens 270, and fiber optic cable 290. Each of diode sub-systems 210, 220, 230, and 240 can include a diode laser (211, 221, 231, or 241), a fast axis collimator (213, 223, 233, and 243), and a slow axis collimator (215, 225, 235, and 245). Light pulses emanating from diode 211 passes through fast collimator 213 and slow collimator 215. The combination of fast and slow axis collimators 213 and 215 control the focal length and beam shape of the light emitted by diode laser 211. Light pulses emanating from diode lasers 221, 231, and 241 pass through own respective fast and slow axis collimators, which control the focal lengths of the light emitted by those diode lasers. After the light pulses pass through respective slow air collimators, the light pulse interacts with a mirror or a polarization beam splitter.

Figure 2C:
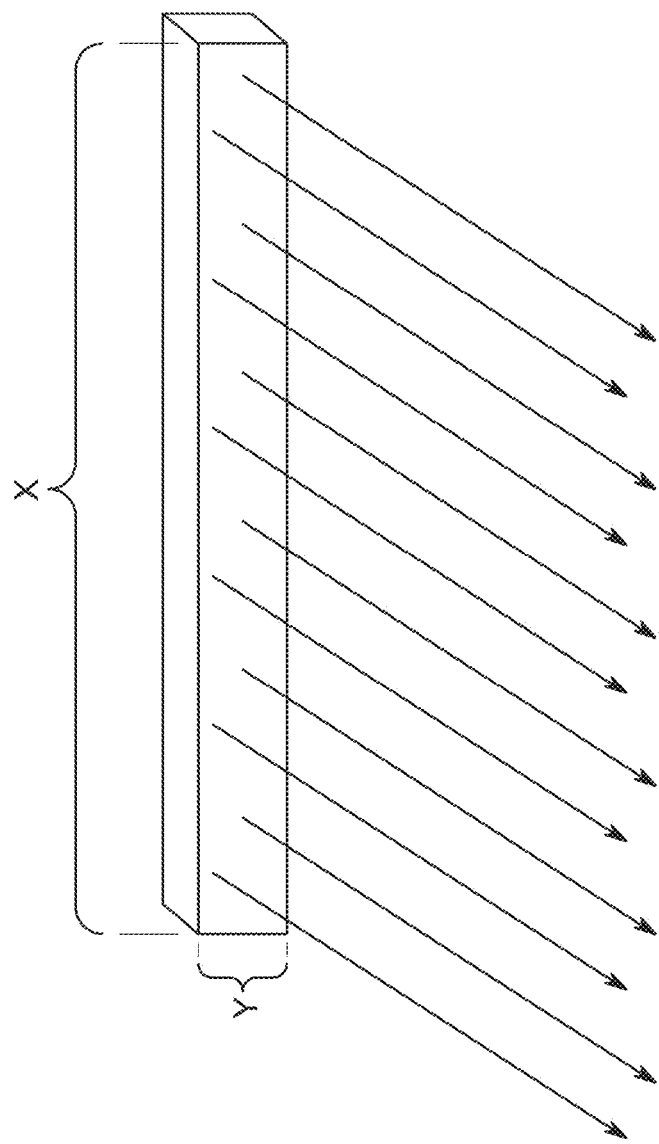
FIG. 2C shows an illustrative view of a multi-mode diode emitter according to an embodiment.

Diode laser 211, 221, 231, and 241 may each be multimode laser emitters or emitter stack and not single mode emitters. Multi-mode diode lasers are much cheaper and powerful than signal mode emitters. For example, in one embodiment, diode laser 211 may be an 85 μm diode laser available from Laser Components, Inc. of Bedford, New Hampshire FIG. 2C shows an illustrative block diagram of diode laser 211. Diode laser 211 is operative to emit a multi-mode laser beam out of its X-Y plane, as indicated by the laser beams (shown as arrows). As shown, X is substantially larger than Y. Thus, the width (e.g., X plane) of the laser beam is substantially larger than its height (e.g. Y plane). MDOFC 200 can input a laser beam that has a height that is substantially the same as its width. MDOFC 200 does this by combining pairs of beams (a beam from two different diode lasers) and stacking those combined beams on top of each other.

For each of diode lasers 211, 221, 231, and 241, their respective slow and fast axis collimators adjust the size, shape, and divergence angle of the beam emanating from each diode laser. That is, the fast and slow axis collimators precondition the beam from each laser diode before pairs of beams (each associated with a different diode laser) are combined or integrated to form an integrated beam and couple into a given fiber 290. See FIGS. 2A and 2B, which show the beam changing shape and size from one collimator to the other. In one embodiment, diode lasers 211 and 241 may be one of transverse electric (TE) or transverse magnetic (TM) polarization modes and diode lasers 221 and 231 may be the opposite polarization mode of diode lasers 211 and 241. For example, if diode lasers 211 and 241 are TE diode lasers, diode lasers 221 and 231 are TM diode lasers. As will be explained below, the beams emanating from diode lasers 211 and 221 are combined together and the beams emanating from diode lasers 231 and 241 are combined together. Since diode laser 211 is in the TE configuration and diode laser 221 is in the TM configuration, they can be combined by a polarization beam splitter. The same logic holds true for diode lasers 231 and 241.

Diode sub-systems 210 and 220 may combine their respective light pulses to form a first integrated beam that is directed towards fiber 290 via lens 270. Light emitted from sub-system 210 is reflected by mirror 250 and is combined with light emitted from sub-system 220 at PBS 260 to yield first integrated beam 280. First integrated beam 280 is projected along a first plane defined by the position of mirror 250 and PBS 260. Diode sub-systems 230 and 240 may combine their respective light pulses to form a second integrated beam that is directed towards fiber 290 via lens 270. Light emitted from sub-system 230 is reflected by mirror 252 and is combined with light emitted from sub-system 240 at PBS 262 to yield second integrated beam 282. Second integrated beam 282 is projected along a second plane defined by the position of mirror 252 and PBS 262. The first and second planes are parallel to each other but offset from each other by a fixed distance such that the first and second integrated beams 280 and 282 are stacked on top of each other and are directed through optical lens 270, which may be an aspherical lens. Lens 270 can combine beams 280 and 282 to form third integrated beam 284. Third integrated beam 284 may be input directly into fiber 290.

It should be appreciated that the design and configuration of MDOFC 200 may vary depending on a number of different factors. For example, the diameter of the core and the numerical aperture of fiber 290 may dictate the size and operating properties of each diode laser chosen for use in MDOFC 200, the offset distance between paired diode lasers, and how many paired diode lasers can be stacked together. For example, the offset distance between first and second integrated beams 280 and 282 may be set to maximize power transfer of integrated beam 284 into fiber 290. It should be further appreciated that the positioning of diode sub-systems 210, 220, 230, and 240 can be rearranged. For example, diode sub-system 210 can be positioned such that it is aligned adjacent to sub-system 220, and similarly, sub-system 240 can also be positioned adjacent to sub-system 230 so that all sub-systems 210, 220, 230, and 240 are on the same side of the beams 280 and 282. Other components such as mirror 250 and PBS 262 may have to be reoriented to accommodate the different positions of sub-systems 210 and 240.

Figure 2E:
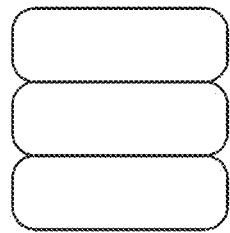
FIGS. 2D, 2E, and 2F each show different integrated beam patterns that can be produced with different arrangements of diode sub-systems, according to various embodiments.
Figure 2F:
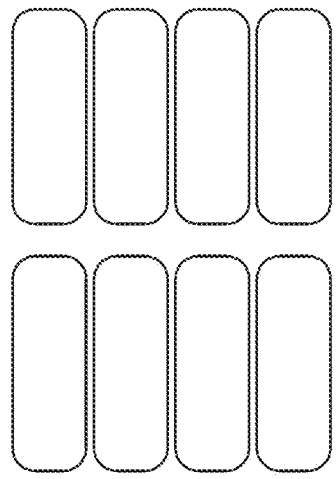
Figure 2D:
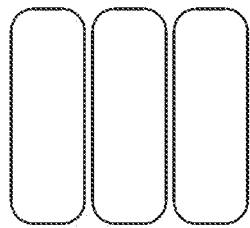

If desired, any suitable number of diode sub-system pairs may be stacked together to produce the desired integrated beam for coupling with the fiber. For example, if desired, three or more coupled pairs of diode laser beams may be stacked on top of each other. In some embodiments, the final integrated beam input into the fiber optic cable may be the product of a 1×N column of diode sub-system pairs (as illustrated in FIG. 2D), a 1×M row of diode sub-system pairs (as illustrated in FIG. 2E), or a M×N matrix of diode sub-system pairs (as illustrated in FIG. 2F), where M and N are integers greater than zero. FIGS. 2D, 2E, and 2F each show different integrated beam patterns that can be produced with different arrangements of diode sub-systems.

Advantages of using diode lasers, as compared to fiber lasers is that they are relatively cheap, exhibit dynamic power control, and have relatively low power consumption. By combining pairs of laser diodes and stacking them together according to embodiments discussed herein, a non-elliptical beam pattern can be produced in the scanning system 150 (e.g., such as a square or circular shaped beam depending on shape of the fiber), the beam pattern is eye-safe, the repetition rate can be increased (e.g., a multiple of the repetition rate of one laser diode), and peak power can be increased.

Control circuitry (not shown) can sequentially fire each diode laser. Assuming each diode laser operates at a fixed repetition rate of X, a sequential firing of MDOFC 200 can result in a repetition rate that is at least four times X (because there are four laser diodes being fired in sequence). Moreover, because multiple lasers are being used together, the combined power output of the integrated beam coupled to the fiber is greater than any one diode laser. Use of diode emitters, as opposed to fiber lasers, enables the control circuitry to exercise dynamic power control over the power output provided MDOFC. That is, the control circuitry can adjust power output of MDOFC to varying between 0 and maximum power output in an order of a micro-second. Such dynamic power control is not possible with fiber lasers. In some embodiments, the diode lasers being used in MDOFC 200 may emit light pulses at a wavelength of about 800-1560 nm.

It should be appreciated that in some embodiments, beam splitters are not needed. For example, the control system can contain just one diode laser that sends its beam into a lens that converges down to the appropriate angle before entry into the fiber optic cable. As another example, if two diode lasers are used, they can be arranged adjacent to each other such that their respective beams form an integrated beam that is input into to the lens before entry into the fiber optic cable. Any suitable number of diodes may be arranged together to form a desired integrated beam.

Figure 3:
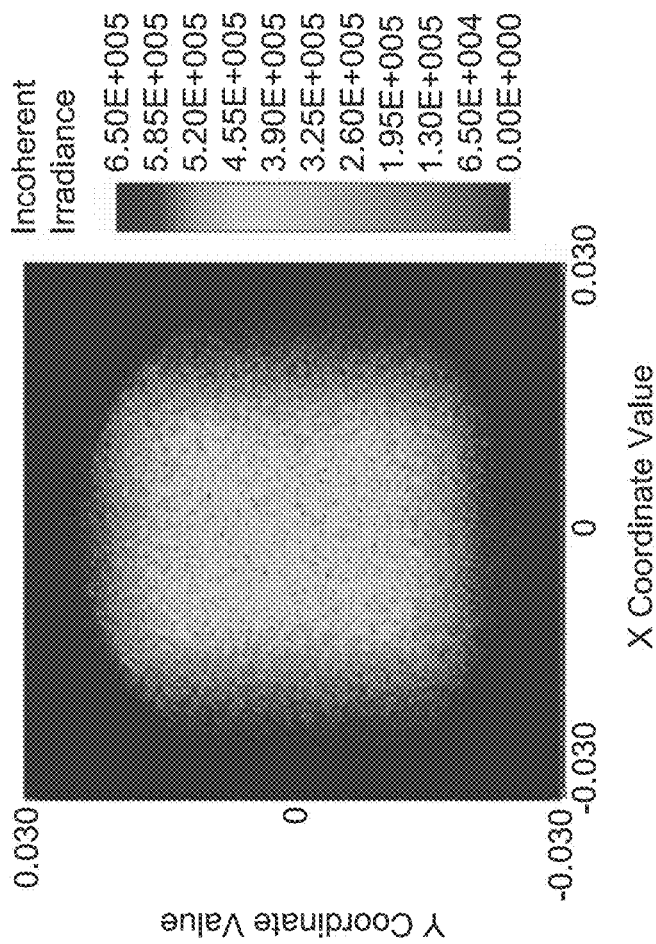
FIG. 3 shows an illustrative simulation result showing irradiance of an integrated laser light signal being provided by a multi-diode laser and optical fiber coupling to a fiber at the coupling, according to an embodiment.

FIG. 3 shows an illustrative simulation result showing irradiance of an integrated laser light signal being provided by MDOFC 200 to a fiber at the coupling, according to an embodiment. In one embodiment, the irradiance pattern of FIG. 3 may represent third integrated beam 284 that is input to fiber 290. If the simulation ignores loss from the AR coating, mirror reflectivity, PBS loss, and extinction ratio of the diode lasers, a coupling efficiency of at least 98% can be reached. As shown in FIG. 3, the irradiance pattern is substantially square. This square-like shape is the product of the stacking of the combined pairs of diode laser emissions (e.g., stacking of first and second integrated beams 280 and 282). The divergence angle of the integrated beam provided by MDOFC 200 is also designed to comply with the numerical aperture of coupling fiber 290.

Placement of MDOFC 200 within the interior portion of a vehicle and not in the scanning system simplifies design constraints of the scanning system. The fiber optic cable transports the laser signals from MDOFC to the scanning system. This frees the scanning system from heat dissipation issues associated with the diode lasers. Because the diode lasers of MDOFC 200 are contained in the interior portion, heat dissipation of the diode lasers can be controlled more easily than convention systems that incorporate diode lasers in the scanning system. In addition, the design of MDOFC 200 use multiple, lower power, laser diodes that each consume less power than a single laser diode designed to provide the same power output as the combined power output of MDOFC 200. As a result, the laser diodes in MDOFC 200 do not produce as much heat that need to be mitigated, as compared to the single laser diode designed to provide the same power output as the combined power output of MDOFC 200. The design of MDOFC 200 also takes advantages of generous space of the control system 130. A small sized scanning system 150 is preferable, however, minimizing the size compromises the lens design and optical system performance. By embedding MDOFC 200 in control system 130 (within the interior portion), the coupling efficiency to the fiber and system performance can be optimized without constraint of space.

Figure 4:
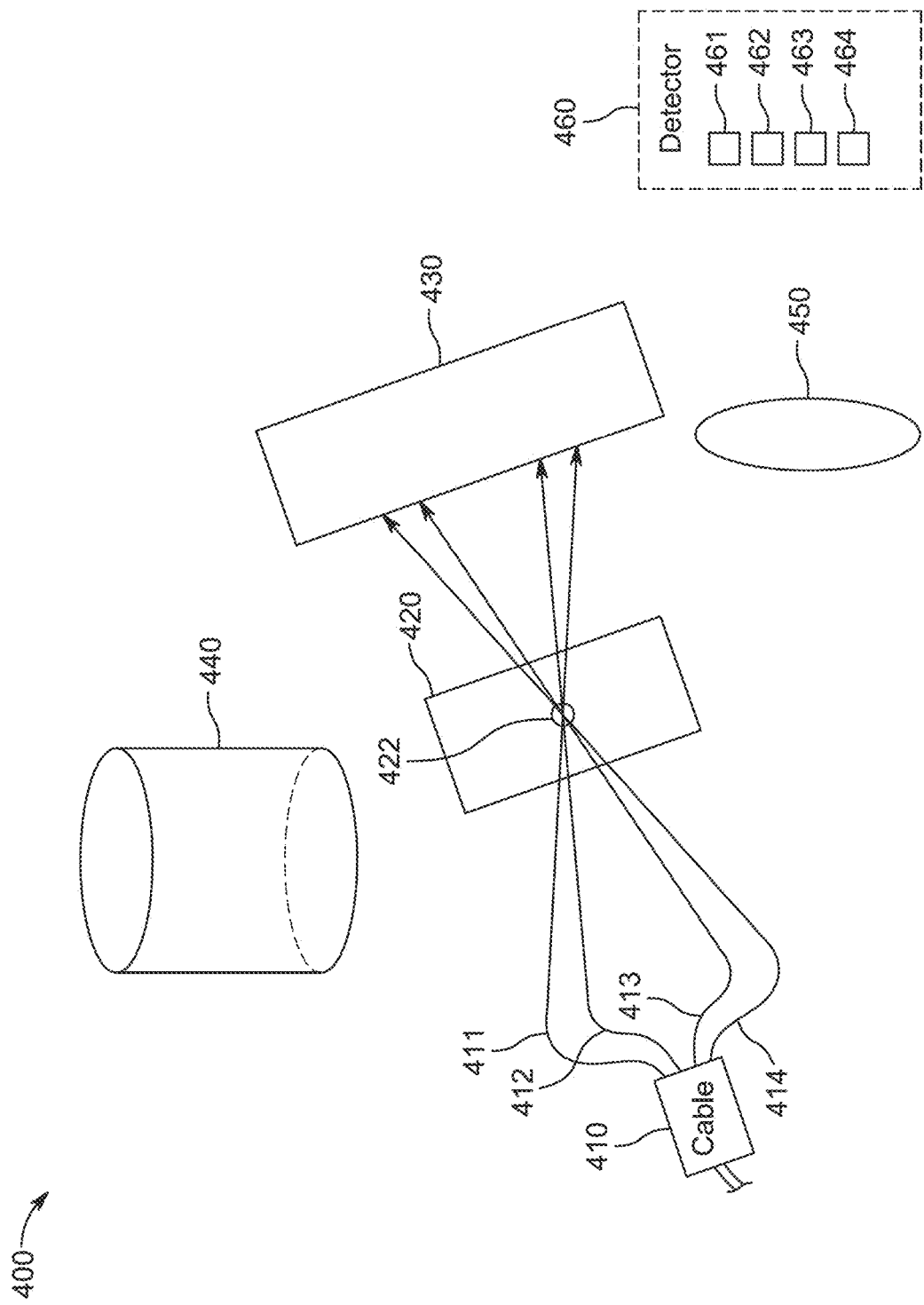
FIG. 4 shows an illustrative block diagram of a scanning system according to an embodiment.

FIG. 4 shows an illustrative block diagram of scanning system 400 according to an embodiment. Scanning system 400 can include fiber optic cable 410, reflective mirror 420, steering optics 430, rotating polygon 440, receiving optics 450, and detector system 460. Fiber optic cable 410 can include one or more optical fibers, each of which serves as a transmission medium for a MDOFC (e.g., such as MDOFC 200). As illustrated in FIG. 4, cable 410 can include four optical fiber tips 411-414. Thus, in this exemplary embodiment, four different MDOFCs exist in the control system contained in the interior portion of a vehicle. Optical fiber tips 411-414 are secured within scanning system 400 and are aligned such that laser pulses being emitted by each optical fiber tip are aimed to pass through through-hole 422 of reflective mirror 420 towards steering optics 430. Steering optics 430 re-direct light pulses towards rotating polygon 440, which re-directs light energy out of scanning system 400. The light energy being directed by rotating polygon 440 is cast in accordance with the field of view parameters of scanning system 400. That is, if scanning system 400 has a field of view with range of x, a lateral angle of y, and vertical angle of z, the range x can be controlled by the power of the emitter(s), the vertical angle z can be controlled by the steering optics 430, and the lateral angle y can be controlled by polygon 440. Light energy that is scattered back from objects in the field of view returns to polygon 440 and is redirected to detector system 460 via steering optics 430, reflective mirror 420, and receiving optics 450. Detector system 460 can include any number of detectors, and four detectors 461-464 are shown in FIG. 4. Each one of detectors 461-464 may correspond to one of optical fiber tips 411-414.

Not shown in FIG. 4 are lenses/collimators associated with each of fiber tips 411-414 to shape the beam emanating from each fiber tip towards steering optics 430. The lenses/collimators collimate a relatively divergent beam emanating from each fiber tip. The beam emanating from each fiber tip may be relatively large (at least compared to a single-mode sourced laser) because the output of the fiber tip is derived from a stacked combination of multi-mode laser beams. As a result, the totality of the beams aimed towards steering optics 430 can be larger in size than the steering optics 430. Reflective mirror 420 is positioned between fiber tips 411-414 and steering optics 430 and sized to reflect receiving beam from steering optics 430 to receiving optics 450, except for the portion of the beams from fiber tips 411-414 passing through through-hole 422. Fiber tips 411-414 can be aligned and aimed such that the combination of their respective beams converges at through-hole 422. This enables reduction of the diameter of through-hole 422, as it is desirable to minimize diameter of through-hole 422 to maximize the quantity of light energy reflected off reflective mirror 420 (from steering optics 430) to receiving optics 450. The appropriate balance is struck based on desired observable distance and return light capture to yield the appropriately sized through-hole 422. In one embodiment, the size of through-hole 422 may be approximately the same size as the beam emanating from the collimator associated with each fiber tip. For example, if the beam emanating from a collimator is about 10 mm, then through-hole 422 may also be about 10 mm.

Figure 5:
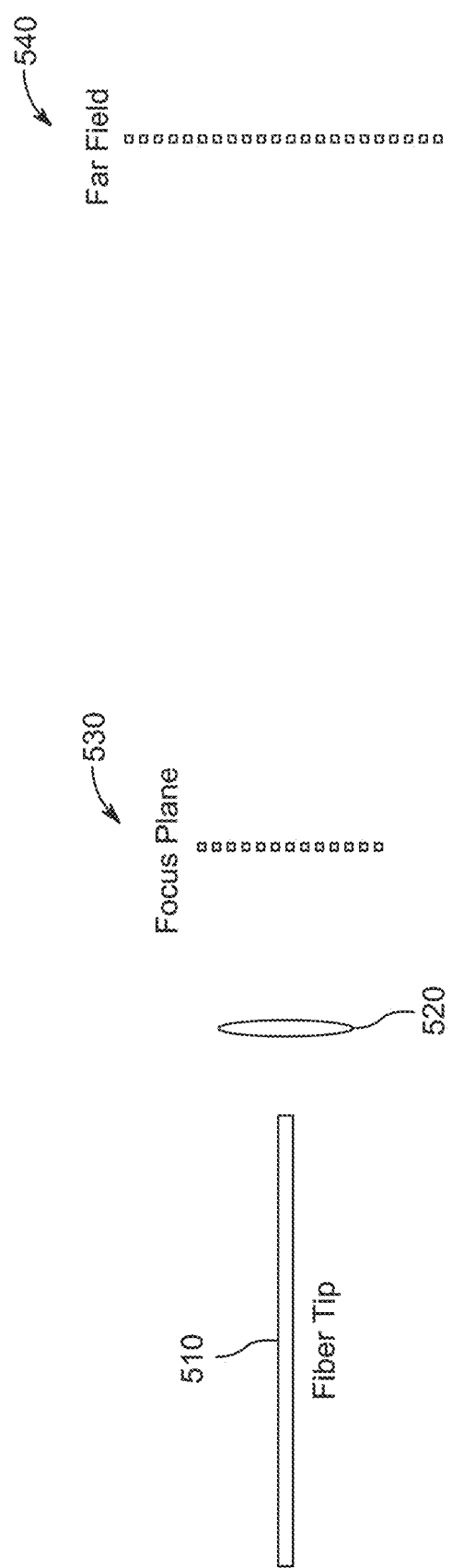
FIG. 5 shows an illustrative beam shape at the near and far fields, according to an embodiment.

FIG. 5 shows an illustrative beam shape at the far field using MDOFC coupled with a fiber optic according to an embodiment. More particularly, FIG. 5 shows fiber optic tip 510 is aligned with collimator 520. Illustrative beam pattern is shown at focus plane 530 and far field plane 540. Fiber optic tip 510 may be part of an optical fiber that is coupled to MDOFC. The beam profile exiting fiber optic tip 510 may be represented by A, the beam profile at focus plane 530 may be represented by B, and the beam profile at far field plane 540 may be represented by C. The beam profile at the far field plane (on an object) has the same shape as the beam existing at the fiber tip, as illustrated. In terms of relationships, assume B is proportional to the Fourier transform of A and C is proportional to Fourier transform of B, as a result, C~A.

The MDOFC coupled to fiber tip 510 may operate as a multi-mode emitter. Operating in as multi-mode emitter provides a relatively square-shaped beam (as shown in FIG. 3) at the MDOFC/fiber coupling. The square shaped beam is more desirable compared to the beam resulting from a single-mode emitter or fiber laser, which has a Gaussian shaped beam. Depending on the shape of the optical fiber, the beam exiting the fiber tip can be square (if a square shaped cross-sectional fiber is used) or circular (if a circular shaped cross-sectional fiber is used). If square shaped cross-sectional optic fiber is used, the resulting beam in far field can fill the space without a need for over filling or under filling.

Figure 6:
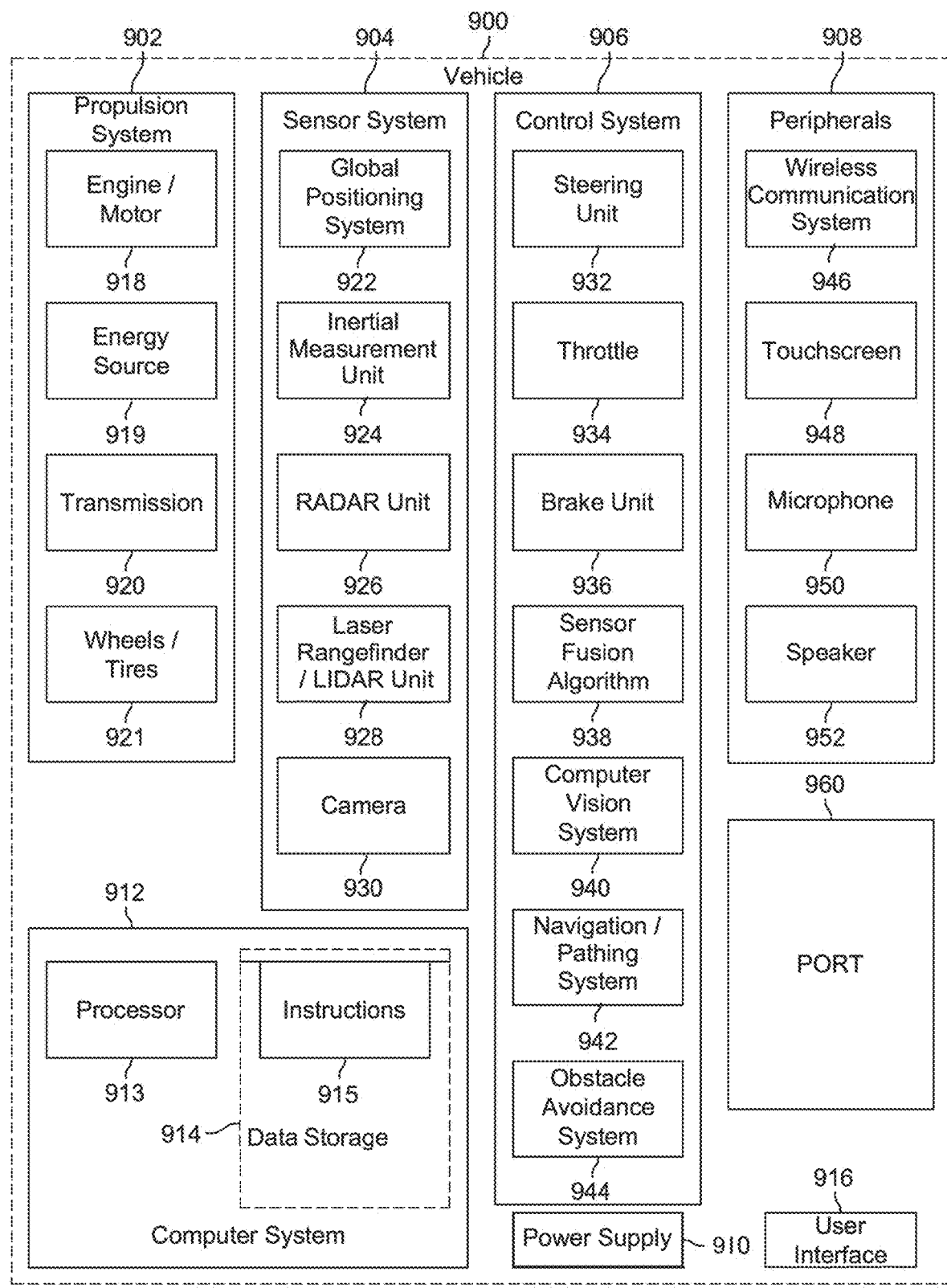
FIG. 6 is a functional block diagram illustrating a vehicle system, according to an embodiment.

FIG. 6 is a functional block diagram illustrating a vehicle system 900, according to an example embodiment. Vehicle 900 can be configured to operate fully or partially in an autonomous mode. For example, vehicle 900 can control itself while in the autonomous mode, and may be operable to determine a current state of the vehicle and its environment, determine a predicted behavior of at least one other vehicle in the environment, determine a confidence level that may correspond to a likelihood of the at least one other vehicle to perform the predicted behavior, and control vehicle 900 based on the determined information. While in autonomous mode, the vehicle 900 may be configured to operate without human interaction.

In some embodiments, vehicle 900 can operate under solely control of a human operator, but the various sensors and systems of the vehicle and the road conditions (e.g., road and the path traveled, other vehicles, stop signs, traffic lights, various events occurring outside of the vehicle) can be monitored and recorded.

Vehicle 900 can include various subsystems such as a propulsion system 902, a sensor system 904, a control system 906, one or more peripherals 908, as well as a power supply 910, a computer system 912, and a user interface 916. Vehicle 900 may include more or fewer subsystems and each subsystem can include multiple elements. Further, each of the subsystems and elements of vehicle 900 can be interconnected. Thus, one or more of the described functions of the vehicle 900 may be divided up into additional functional or physical components, or combined into fewer functional or physical components. In some further examples, additional functional and/or physical components may be added to the examples illustrated by FIG. 9.

Propulsion system 902 may include components operable to provide powered motion for the vehicle 900. Depending upon the embodiment, the propulsion system 902 can include an engine/motor 918, an energy source 919, a transmission 920, and wheels/tires 921. The engine/motor 918 can be any combination of an internal combustion engine, an electric motor, steam engine, Stirling engine, or other types of engines and/or motors. In some embodiments, the engine/motor 918 may be configured to convert energy source 919 into mechanical energy. In some embodiments, the propulsion system 902 can include multiple types of engines and/or motors. For instance, a gas-electric hybrid car can include a gasoline engine and an electric motor. Other examples are possible.

Energy source 919 can represent a source of energy that may, in full or in part, power the engine/motor 918. That is, the engine/motor 918 can be configured to convert the energy source 919 into mechanical energy. Examples of energy sources 919 include gasoline, diesel, other petroleum-based fuels, propane, other compressed gas-based fuels, ethanol, solar panels, batteries, and other sources of electrical power. The energy source(s) 919 can additionally or alternatively include any combination of fuel tanks, batteries, capacitors, and/or flywheels. The energy source 919 can also provide energy for other systems of the vehicle 900.

Transmission 920 can include elements that are operable to transmit mechanical power from the engine/motor 918 to the wheels/tires 921. To this end, the transmission 920 can include a gearbox, clutch, differential, and drive shafts. The transmission 920 can include other elements. The drive shafts can include one or more axles that can be coupled to the one or more wheels/tires 921.

Wheels/tires 921 of vehicle 900 can be configured in various formats, including a unicycle, bicycle/motorcycle, tricycle, or car/truck four-wheel format. Other wheel/tire geometries are possible, such as those including six or more wheels. Any combination of the wheels/tires 921 of vehicle 900 may be operable to rotate differentially with respect to other wheels/tires 921. The wheels/tires 921 can represent at least one wheel that is fixedly attached to the transmission 920 and at least one tire coupled to a rim of the wheel that can make contact with the driving surface. The wheels/tires 921 can include any combination of metal and rubber, or another combination of materials.

Sensor system 904 may include a number of sensors configured to sense information about an environment of the vehicle 900. For example, the sensor system 904 can include a Global Positioning System (GPS) 922, an inertial measurement unit (IMU) 924, a RADAR unit 926, a laser rangefinder/LIDAR unit 928, and a camera 930. The sensor system 904 can also include sensors configured to monitor internal systems of the vehicle 900 (e.g., 02 monitor, fuel gauge, engine oil temperature). Other sensors are possible as well.

One or more of the sensors included in sensor system 904 can be configured to be actuated separately and/or collectively in order to modify a position and/or an orientation of the one or more sensors.

GPS 922 may be any sensor configured to estimate a geographic location of the vehicle 900. To this end, GPS 922 can include a transceiver operable to provide information regarding the position of the vehicle 900 with respect to the Earth.

IMU 924 can include any combination of sensors (e.g., accelerometers and gyroscopes) configured to sense position and orientation changes of the vehicle 900 based on inertial acceleration.

RADAR unit 926 may represent a system that utilizes radio signals to sense objects within the local environment of the vehicle 900. In some embodiments, in addition to sensing the objects, the RADAR unit 926 may additionally be configured to sense the speed and/or heading of the objects. Similarly, laser rangefinder or LIDAR unit 928 may be any sensor configured to sense objects in the environment in which the vehicle 900 is located using lasers. Depending upon the embodiment, the laser rangefinder/LIDAR unit 928 can include one or more laser sources, a laser scanner, and one or more detectors, among other system components. The laser rangefinder/LIDAR unit 928 can be configured to operate in a coherent (e.g., using heterodyne detection) or an incoherent detection mode.

Camera 930 can include one or more devices configured to capture a plurality of images of the environment of vehicle 900. Camera 930 can be a still camera or a video camera.

Control system 906 may be configured to control operation of vehicle 900 and its components. Accordingly, control system 906 can include various elements include steering unit 932, throttle 934, brake unit 936, a sensor fusion algorithm 938, a computer vision system 940, a navigation/pathing system 942, and an obstacle avoidance system 944.

Steering unit 932 can represent any combination of mechanisms that may be operable to adjust the heading of vehicle 900. Throttle 934 can be configured to control, for instance, the operating speed of the engine/motor 918 and, in turn, control the speed of the vehicle 900. Brake unit 936 can include any combination of mechanisms configured to decelerate the vehicle 900. Brake unit 936 can use friction to slow wheels/tires 921. In other embodiments, the brake unit 936 can convert the kinetic energy of wheels/tires 921 to electric current. The brake unit 936 may take other forms as well. The brake unit 936 may control braking of the vehicle 900, for example, using a braking algorithm that takes into account input from one or more units of the sensor system 904.

Sensor fusion algorithm 938 may be an algorithm (or a computer program product storing an algorithm) configured to accept data from the sensor system 904 as an input. The data may include, for example, data representing information sensed at the sensors of the sensor system 904. The sensor fusion algorithm 938 can include, for instance, a Kalman filter, Bayesian network, or other algorithm. The sensor fusion algorithm 938 can further provide various assessments based on the data from sensor system 904. Depending upon the embodiment, the assessments can include evaluations of individual objects and/or features in the environment of vehicle 900, evaluation of a particular situation, and/or evaluate possible impacts based on the particular situation. Other assessments are possible.

Computer vision system 940 may be any system operable to process and analyze images captured by camera 930 in order to identify objects and/or features in the environment of vehicle 900 that can include traffic signals, road way boundaries, and obstacles. Computer vision system 940 can use an object recognition algorithm, a Structure From Motion (SFM) algorithm, video tracking, and other computer vision techniques. In some embodiments, the computer vision system 940 can be additionally configured to map an environment, track objects, estimate the speed of objects, etc.

Navigation and pathing system 942 may be any system configured to determine a driving path for the vehicle 900, for example, by referencing navigation data such as geographical or map data. The navigation and pathing system 942 may additionally be configured to update the driving path dynamically while the vehicle 900 is in operation. In some embodiments, the navigation and pathing system 942 can be configured to incorporate data from the sensor fusion algorithm 938, the GPS 922, and one or more predetermined maps so as to determine the driving path for vehicle 900. Obstacle avoidance system 944 can represent a control system configured to identify, evaluate, and avoid or otherwise negotiate potential obstacles in the environment of the vehicle 900. Control system 906 may additionally or alternatively include components other than those shown and described.

Peripherals 908 may be configured to allow interaction between the vehicle 900 and external sensors, other vehicles, other computer systems, and/or a user. For example, peripherals 908 can include a wireless communication system 946, a touchscreen 948, a microphone 950, and/or a speaker 952. In an example embodiment, peripherals 908 can provide, for instance, means for a user of the vehicle 900 to interact with the user interface 916. To this end, touchscreen 948 can provide information to a user of vehicle 900. User interface 916 can also be operable to accept input from the user via the touchscreen 948. The touchscreen 948 may be configured to sense at least one of a position and a movement of a user's finger via capacitive sensing, resistance sensing, or a surface acoustic wave process, among other possibilities. Touchscreen 948 may be capable of sensing finger movement in a direction parallel or planar to the touchscreen surface, in a direction normal to the touchscreen surface, or both, and may also be capable of sensing a level of pressure applied to the touchscreen surface. Touchscreen 948 may be formed of one or more translucent or transparent insulating layers and one or more translucent or transparent conducting layers. Touchscreen 948 may take other forms as well.

In other instances, peripherals 908 may provide means for the vehicle 900 to communicate with devices within its environment. Microphone 950 may be configured to receive audio (e.g., a voice command or other audio input) from a user of vehicle 900. Similarly, speakers 952 may be configured to output audio to the user of vehicle 900.

In one example, wireless communication system 946 can be configured to wirelessly communicate with one or more devices directly or via a communication network. For example, wireless communication system 946 can use 3G cellular communication, such as CDMA, EVDO, GSM/GPRS, or 4G cellular communication, such as WiMAX or LTE. Alternatively, wireless communication system 946 can communicate with a wireless local area network (WLAN), for example, using WiFi. In some embodiments, wireless communication system 946 can communicate directly with a device, for example, using an infrared link, Bluetooth, or ZigBee. Other wireless protocols, such as various vehicular communication systems, are possible within the context of the disclosure. For example, the wireless communication system 946 can include one or more dedicated short range communications (DSRC) devices that can include public and/or private data communications between vehicles and/or roadside stations.

Power supply 910 may provide power to various components of vehicle 900 and can represent, for example, a rechargeable lithium-ion or lead-acid battery. In some embodiments, one or more banks of such batteries can be configured to provide electrical power. Other power supply materials and configurations are possible. In some embodiments, the power supply 910 and energy source 919 can be implemented together, as in some all-electric cars.

Many or all of the functions of vehicle 900 can be controlled by computer system 912. Computer system 912 may include at least one processor 913 (which can include at least one microprocessor) that executes instructions 915 stored in a non-transitory computer readable medium, such as the data storage 914. Computer system 912 may also represent a plurality of computing devices that may serve to control individual components or subsystems of the vehicle 900 in a distributed fashion.

In some embodiments, data storage 914 may contain instructions 915 (e.g., program logic) executable by processor 913 to execute various functions of vehicle 900, including those described above in connection with FIG. 9. In some embodiments, processor 913 may be operative to run an artificial intelligence (AI) engine, for example, to control the various systems of the vehicle 900. Data storage 914 may contain additional instructions as well, including instructions to transmit data to, receive data from, interact with, and/or control one or more of propulsion system 902, sensor system 904, control system 906, and peripherals 908. In addition to instructions 915, data storage 914 may store data such as roadway maps, path information, among other information. Such information may be used by vehicle 900 and computer system 912 at during the operation of vehicle 900 in the autonomous, semi-autonomous, and/or manual modes.

Vehicle 900 may include a user interface 916 for providing information to or receiving input from a user of vehicle 900. User interface 916 can control or enable control of content and/or the layout of interactive images that can be displayed on the touchscreen 948. Further, user interface 916 can include one or more input/output devices within the set of peripherals 908, such as wireless communication system 946, touchscreen 948, microphone 950, and the speaker 952.

Port 960 may be a port through which vehicle 900 receives power to charge power supply 910 and to communicate data stored in data store 914.

Computer system 912 may control the function of vehicle 900 based on inputs received from various subsystems (e.g., propulsion system 902, sensor system 104, and control system 906), as well as from user interface 916. For example, computer system 912 may utilize input from control system 906 in order to control steering unit 932 to avoid an obstacle detected by sensor system 904 and obstacle avoidance system 944. Depending upon the embodiment, computer system 912 can be operable to provide control over many aspects of vehicle 900 and its subsystems.

The components of vehicle 900 can be configured to work in an interconnected fashion with other components within or outside their respective systems. For instance, in an example embodiment, camera 930 can capture a plurality of images that can represent information about a state of an environment of vehicle 900 operating in an autonomous or manual mode. The environment can include every conceivable type of data that can be observed and collected by vehicle 900. For example, the environment can include the road and all aspects associated with the road such as temperature, composition of the road (e.g., concrete or asphalt), moisture level, lanes, curbs, turn lanes, cross walks, stop lights, stop signs, yield signs and other traffic signs, and barricades. The environment can include objects such as other vehicles, people, random debris in or adjacent to the road.

Computer system 912 can monitor and log the environmental inputs in conjunction with operational states of the vehicle. The operational states can refer to operational and control parameters of the vehicle such as speed, trajectory, steering input, acceleration input, and brake input, and also can include results of driver input or AI driver input. This way, regardless of whether the vehicle is operating in autonomous mode or under human control, computer system 912 can simultaneously log the environmental inputs and the operational states to provide a comprehensive vehicle log.

Although FIG. 6 shows various components of vehicle 900, i.e., wireless communication system 946, computer system 912, data storage 914, and user interface 916, as being integrated into vehicle 900, one or more of these components can be mounted or associated separately from the vehicle 900. For example, data storage 914 can, in part or in full, exist separate from vehicle 900. Thus, vehicle 900 can be provided in the form of device elements that may be located separately or together. The device elements that make up vehicle 900 can be communicatively coupled together in a wired and/or wireless fashion.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

Moreover, any processes described with respect to FIGS. 1-6, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices. The computer-readable medium can also be distributed over network-coupled computer systems so that the computer readable code is stored and executed in a distributed fashion. For example, the computer-readable medium may be communicated from one electronic subsystem or device to another electronic subsystem or device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module or state machine discussed herein may be provided as a software construct, firmware construct, one or more hardware components, or a combination thereof. For example, any one or more of the state machines or modules may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules or state machines are merely illustrative, and that the number, configuration, functionality, and interconnection of existing modules may be modified or omitted, additional modules may be added, and the interconnection of certain modules may be altered.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A light detection and ranging (LiDAR) system, comprising:
    a control system constructed to be contained within an interior portion of a vehicle, the control system comprising:
        control circuitry; and
        a multi-diode laser and optical fiber coupling (MDOFC) coupled to the control circuitry and operative to generate an integrated light beam derived from a plurality of light beams;
    a scanning system constructed to be mounted to an exterior portion of the vehicle; and
    a fiber optic cable coupled to the MDOFC and the scanning system, wherein the fiber optic cable transmits the integrated light beam to the scanning system,
    wherein the scanning system comprises fiber optic cable mounting hardware that aligns two or more fiber optic tips so that beams from the two or more fiber optic tips converge and pass through a reflective mirror, and
    wherein the scanning system further comprises steering optics configured to direct the beams passed through the reflective mirror toward outside of the LiDAR system and to direct light returned to the LiDAR system toward the reflective mirror, and the steering optics move relative to the fiber optic tips providing the beams.

2. The LiDAR system of claim 1, wherein the MDOFC is a first of a plurality of MDOFCs, and wherein the fiber optic cable comprises a plurality of optical fibers, and wherein each of the plurality of MDOFCs is coupled to a respective one of the plurality of optical fibers.

3. The LiDAR system of claim 1, wherein the MDOFC comprises a stack of at least two coupled pairs of laser diodes.

4. The LiDAR system of claim 3, wherein outputs of a first of the at least two coupled pairs of laser diodes generate a first integrated beam that is directed along a first plane, and wherein outputs of a second of the at least two coupled pairs generate a second integrated beam that is directed along a second plane, wherein the first and second planes are offset by a fixed distance.

5. The LiDAR system of claim 4, wherein the first and second integrated beams form a third integrated beam that is input into the fiber optic cable.

6. The LiDAR system of claim 1, wherein the MDOFC comprises:
    first, second, third, and fourth diode sub-systems each operative to emit respective first, second, third, and fourth light pulses;
    a first polarization beam splitter operative to combine the first and second light pulses to generate a first integrated beam;
    a second polarization beam splitter operative to combine the third and fourth light pulses to generate a second integrated beam; and
    wherein the first and second polarization beam splitters are positioned such that the first integrated beam is stacked above or below the second integrated beam.

7. The LiDAR system of claim 6, wherein a stacking of the first and second integrated beams is provided as an input to the fiber optic cable.

8. The LiDAR system of claim 6, further comprising:
    a first mirror operative to direct the first light pulse to the first polarization beam splitter; and
    a second mirror operative to direct the third light pulse to the second polarization beam splitter.

9. The LiDAR system of claim 6, further comprising an optical lens coupled to receive the first and second integrated beams, wherein an output of the optical lens provides the third integrated beam.

10. The LiDAR system of claim 6, wherein each of the first, second, third, and fourth diode sub-systems comprises:
- a laser diode;
- a slow axis collimator; and
- a fast axis collimator.

11. The LiDAR system of claim 10, wherein the laser diode emits a light pulse having a wavelength of 800-1560 nm.

12. The LiDAR system of claim 10, wherein the control circuitry is operative to drive the laser diodes in each of the first, second, third, and fourth diode sub-systems in a sequence.

13. The LiDAR system of claim 1, wherein a beam profile exiting out of at least one of the two or more fiber optic tips is approximately the same as its far field beam profile.

14. The LiDAR system of claim 1, wherein the scanning system comprises:
- receiving optics; and
- a detector system,
- wherein the reflective mirror is positioned between the at least one fiber optic tip of the two or more fibers optical tips and the steering optics, the reflective mirror comprising a through-hole, wherein a beam emanating from the at least one fiber optic tip passes through the through-hole towards the steering optics.

15. A laser system for use with a fiber optic cable, comprising:
- control circuitry; and
- a multi-diode laser and optical fiber coupling (MDOFC) coupled to the control circuitry and the fiber optic cable, the MDOFC being operative to generate an optic fiber input beam that is a stack of integrated beams derived from a plurality of diode lasers that emit beams in a multi-mode, wherein the optic fiber input beam is input into the fiber optic cable including two or more fiber optic tips,
- wherein fiber optic cable mounting hardware aligns the two or more fiber optic tips so that beams from the two or more fiber optic tips converge and pass through a reflective mirror, and
- wherein steering optics of a scanner are configured to direct the beams passed through the reflective mirror toward outside of the scanner and to direct light returned to the scanner toward the reflective mirror, and the steering optics move relative to the fiber optic tips providing the beams.

16. The laser system of claim 15, wherein the MDOFC comprises a stack of at least two coupled pairs of laser diodes.

17. The laser system of claim 16, wherein outputs of a first of the at least two coupled pairs of laser diodes generate a first integrated beam that is directed along a first plane, and wherein outputs of a second of the at least two coupled pairs generate a second integrated beam that is directed along a second plane, wherein the first and second planes are offset by a fixed distance.

18. The laser system of claim 17, wherein the first and second integrated beams form a third integrated beam that is input into the fiber optic cable.

19. The laser system of claim 15, wherein the MDOFC comprises:
- first, second, third, and fourth diode sub-systems each operative to emit respective first, second, third, and fourth light pulses;
- a first polarization beam splitter operative to combine the first and second light pulses to generate a first integrated beam;
- a second polarization beam splitter operative to combine the third and fourth light pulses to generate a second integrated beam; and
- wherein the first and second polarization beam splitters are positioned such that the first integrated beam is stacked above or below the second integrated beam.

20. The laser system of claim 19, wherein a stacking of the first and second integrated beams is provided as an input to the fiber optic cable.

21. The laser system of claim 19, further comprising:
- a first mirror operative to direct the first light pulse to the first polarization beam splitter; and
- a second mirror operative to direct the third light pulse to the second polarization beam splitter.

22. The laser system of claim 19, further comprising an optical lens coupled to receive the first and second integrated beams.

23. The laser system of claim 19, wherein each of the first, second, third, and fourth diode sub-systems comprises:
- a laser diode;
- a slow axis collimator; and
- a fast axis collimator.

24. A light detection and ranging (LiDAR) system, comprising:
- a control system contained within a temperature controlled environment, the control system comprising:
  - control circuitry;
  - at least one diode laser each operative to emit a light beam in response to control signals provided by the control circuitry; and
  - a lens that converges each light beam to have an angle less than a threshold;
- a scanning system mounted outside of the temperature controlled environment; and
- a fiber optic cable coupled to the control system and the scanning system, wherein the fiber optic cable receives a converged light beam from the lens and transmits the light beam to the scanning system,
- wherein the scanning system comprises fiber optic cable mounting hardware that aligns two or more fiber optic tips so that beams from the two or more fiber optic tips converge and pass through a reflective mirror, and
- wherein the scanning system further comprises steering optics configured to direct the beams passed through the reflective mirror toward outside of the LiDAR system and to direct light returned to the LiDAR system toward the reflective mirror, and the steering optics move relative to the fiber optic tips providing the beams.

25. The LiDAR system of claim 24, wherein the threshold is the numerical aperture of the fiber optic cable.

26. The LiDAR system of claim 24, wherein the at least one diode laser comprises at least two diode lasers each operative to emit a light beam in response to control signals provided by the control circuitry.

27. The LiDAR system of claim 26, wherein first and second diode lasers of the at least two diode lasers are positioned adjacent to each other such that their respective light beams form an integrated light beam that is directed into the lens.

28. The LiDAR system of claim 26, further comprising a polarization beam splitter operative to integrate light beams received from first and second diode lasers of the at least two diode lasers to yield an integrated light beam that is directed into the lens.

29. The LiDAR system of claim 24, wherein the scanning system comprises:

receiving optics;
a detector system; and
wherein the reflective mirror is positioned between the at least one fiber optic tip of the two or more fiber optic tips and the steering optics, the reflective mirror comprising a through-hole, wherein a beam emanating from the at least one fiber optic tip passes through the through-hole towards the steering optics.

30. The LiDAR system of claim 29, wherein a size of the beam emanating from the at least one fiber optic is approximately equal in size of the through-hole.

* * * * *